(12) United States Patent
Freking et al.

(10) Patent No.: US 8,706,938 B2
(45) Date of Patent: Apr. 22, 2014

(54) BANDWIDTH LIMITING ON GENERATED PCIE PACKETS FROM DEBUG SOURCE

(75) Inventors: Ronald E. Freking, Rochester, MN (US); Elizabeth A. McGlone, Rochester, MN (US); Daniel R. Spach, Pittsboro, NC (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 13/528,224

(22) Filed: Jun. 20, 2012

(65) Prior Publication Data

US 2013/0346801 A1  Dec. 26, 2013

(51) Int. Cl.
*G06F 13/36* (2006.01)
*G06F 13/362* (2006.01)

(52) U.S. Cl.
USPC .......................................................... 710/113

(58) Field of Classification Search
None
See application file for complete search history.

(56) References Cited

U.S. PATENT DOCUMENTS

| | | | |
|---|---|---|---|
| 6,961,793 B2 | 11/2005 | Kato | |
| 7,065,594 B2 | 6/2006 | Ripy et al. | |
| 7,231,475 B1 | 6/2007 | Singla et al. | |
| 7,467,245 B2 | 12/2008 | Metsker | |
| 2001/0055323 A1 | 12/2001 | Rowett et al. | |
| 2006/0041895 A1 | 2/2006 | Berreth | |

*Primary Examiner* — Kris Rhu
(74) *Attorney, Agent, or Firm* — Patterson & Sheridan LLP

(57) ABSTRACT

Method, circuit, and system for performing an operation for regulating bandwidth, the operation comprising receiving at a memory, debug data packets and functional data packets for transmittal on a shared bus. The operation then transmits, via the shared bus, the functional data packets and one or more of the debug data packets according to a predefined ratio of debug data packets to functional data packets. The operation then drops one or more of the received debug data packets at the memory, and maintains a count of the one or more dropped debug data packets. The operation then updates the predefined ratio based on the count, and uses the updated predefined ratio to transmit the functional data packets and one or more of the debug data packets.

14 Claims, 5 Drawing Sheets

BANDWIDTH LIMITING ON GENERATED PCIE PACKETS FROM DEBUG SOURCE

BACKGROUND

Embodiments disclosed herein relate to computer hardware. More specifically, embodiments disclosed herein relate to bandwidth limiting on generated PCIe packets from a debug source.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

A PCI Express bus is an implementation of the Peripheral Components Interconnect ('PCI') computer bus according to the set of PCI Express specifications promulgated by the PCI Special Interest Group ('PCI SIG'). A PCI Express bus uses existing PCI programming and software concepts, but is based on a different and much faster serial physical-layer communications protocol. The physical-layer consists not of a bus, but of a network of serial interconnections extending to each device from a switch. The switch provides point-to-point communications between devices connected to the switch. Devices and switches operating according to the PCI Express specifications are generally referred to as 'PCI Express devices' and 'PCI Express switches' respectively.

A connection between any two PCI Express devices is referred to as a 'link.' A link consists of a collection of one or more lanes used for data communications between devices. Each lane is a set of two unidirectional low voltage differential signaling pairs of transmission pathways such as, for example, traces along a motherboard. Because transmitting data and receiving data are implemented using separate differential pairs, each lane allows for full-duplex serial data communication of up to eight gigabits of data per second.

SUMMARY

One embodiment disclosed herein provides a method for regulating bandwidth, comprising receiving at a memory, debug data packets and functional data packets for transmittal on a shared bus. The method then transmits, via the shared bus, the functional data packets and one or more of the debug data packets according to a predefined ratio of debug data packets to functional data packets. The method then drops one or more of the received debug data packets at the memory, and maintains a count of the one or more dropped debug data packets. The method then updates the predefined ratio based on the count, and uses the updated predefined ratio to transmit the functional data packets and one or more of the debug data packets.

Another embodiment disclosed herein provides a circuit comprising a memory connected to a shared bus, wherein the memory receives debug data packets and functional data packets for transmittal on a shared system bus and an arbiter comprising predefined logic configured to control the transmission, via the shared bus, of the functional data packets and one or more of the debug data packets according to a predefined ratio of debug data packets to functional data packets, wherein one or more of the received debug data packets is dropped from the memory, wherein a count of the one or more dropped debug data packets is maintained, wherein the predefined ratio is updated based on the count, and wherein the updated predefined ratio is used to transmit the functional data packets and one or more of the debug data packets.

Another embodiment disclosed herein provides a system comprising a first device configured to send functional data packets and debug data packets via a shared bus to a second device, a memory configured to receive the functional data packets and the debug data packets from the first device, wherein the memory is connected to the shared bus, an arbitration circuit configured to transmit, via the shared bus, the functional data packets and one or more of the debug data packets according to a predefined ratio of debug data packets to functional data packets, drop one or more of the received debug data packets at the memory, maintain a count of the one or more dropped debug data packets, update the predefined ratio based on the count, and use the updated predefined ratio to transmit the functional data packets and one or more of the debug data packets.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
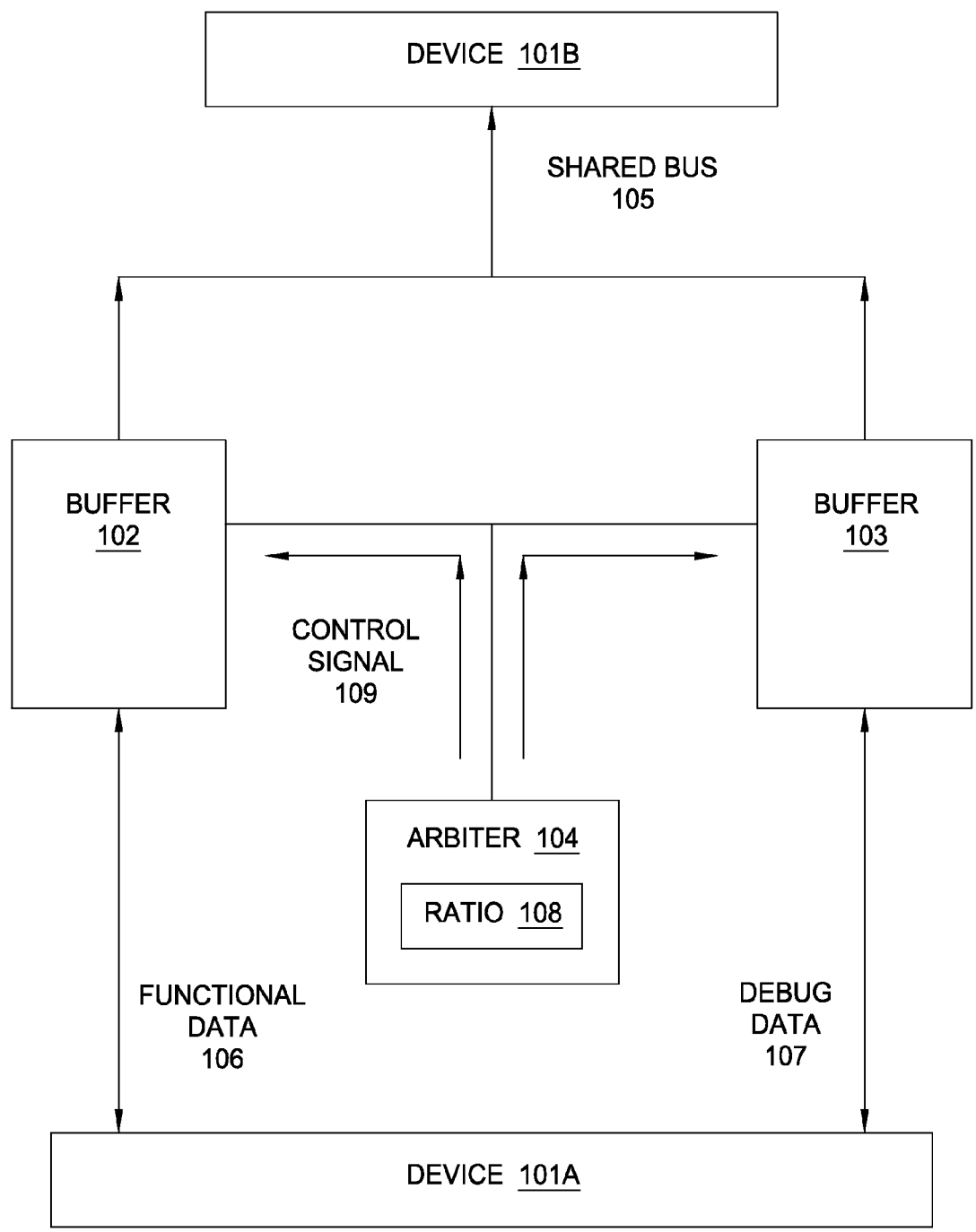
FIG. 1 is a schematic illustrating techniques for bandwidth limiting PCIe packets generated by a debug source, according to one embodiment disclosed herein.

One embodiment disclosed herein provides a method for regulating bandwidth, comprising receiving at a memory, debug data packets and functional data packets for transmittal on a shared bus. The method then transmits, via the shared bus, the functional data packets and one or more of the debug data packets according to a predefined ratio of debug data packets to functional data packets. The method then drops one or more of the received debug data packets at the memory, and maintains a count of the one or more dropped debug data packets. The method then updates the predefined ratio based on the count, and uses the updated predefined ratio to transmit the functional data packets and one or more of the debug data packets.

Another embodiment disclosed herein provides a circuit comprising a memory connected to a shared bus, wherein the memory receives debug data packets and functional data packets for transmittal on a shared system bus and an arbiter comprising predefined logic configured to control the transmission, via the shared bus, of the functional data packets and one or more of the debug data packets according to a predefined ratio of debug data packets to functional data packets, wherein one or more of the received debug data packets is dropped from the memory, wherein a count of the one or more dropped debug data packets is maintained, wherein the predefined ratio is updated based on the count, and wherein the updated predefined ratio is used to transmit the functional data packets and one or more of the debug data packets.

Another embodiment disclosed herein provides a system comprising a first device configured to send functional data packets and debug data packets via a shared bus to a second device, a memory configured to receive the functional data packets and the debug data packets from the first device, wherein the memory is connected to the shared bus, an arbitration circuit configured to transmit, via the shared bus, the functional data packets and one or more of the debug data packets according to a predefined ratio of debug data packets to functional data packets, drop one or more of the received debug data packets at the memory, maintain a count of the one or more dropped debug data packets, update the predefined ratio based on the count, and use the updated predefined ratio to transmit the functional data packets and one or more of the debug data packets.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic 100 illustrating techniques for bandwidth limiting PCIe packets generated by a debug source, according to one embodiment disclosed herein. When a bus is used to transmit functional traffic and debug information, the bus may become over utilized, which may make the system not perform well. Debug information may be transferred on these busses at a fixed rate, or it may be transferred whenever bandwidth is available. Generally, the techniques depicted in FIG. 1 may vary the ratio of functional data packets and debug data packets sent over a shared bus in a manner which limits the negative effects on the system. As used herein, the term "functional data" refers to payload data generated by a computing device and being transferred within a pipeline. For example, a functional data packet may be a network communications packet, a packet carrying graphics information generated by a graphics adapter, and the like. As used herein, the term "debug data" refers to a packet containing debugging information generated in response to detecting anomalous behavior in the computing device. The debug data is generated by a unit along the pipeline that is injected into the pipeline. For example, debug data packets may be generated by a network card or graphics adapter, and carry information related to problems within the respective device, to be sent to a processor or a systems administrator. In some embodiments, the devices may be PCIe compliant devices which generate PCIe debug data packets and PCIe functional data packets. In some embodiments, functional data may be received at a device which was generated by another device, with debug data being injected into the received functional data.

As shown in FIG. 1, device 101A generates and transmits functional data 106 and debug data 107, which is sent to buffers 102 and 103, respectively. Although two separate buffers are shown, in some embodiments, a single buffer may be used to receive both the functional data 106 and the debug data 107. The buffers 102 and 103 each output respective data packets along a shared bus 105 (also referred to as a pipeline), but only one buffer may output packets at a time. A pipeline may be a flow of all packets within a given hierarchy. Arbiter 104 is a circuit configured to regulate the output of the functional data 106 from the buffer 102 and the debug data 107 from the buffer 103. Generally, the functional data 106 may take priority over the debug data 107. Arbiter 104 regulates the flow of each type of data based on a ratio 108, which may be set by a system administrator, or predefined in the arbiter 104. Generally, the ratio 108 may define the number of functional data packets and the number of debug data packets which are sent over the shared bus 105 during any given period of time, or over a predefined number of cycles. For example, a ratio of 9 to 1 may indicate that 9 functional data packets must be sent for every one debug packet sent over the shared bus 105. Any method may be used to define the ratio, and the disclosed ratios are for illustratively purposes only and are not intended to limit the disclosure. Additionally, the arbiter 104 may contain logic for interleaving the functional data packets and the debug data packets. For example, the arbiter may use a cycle count and a random count (such as a linear feedback shift register (LFSR)), the debug data may be transferred x number of cycles out of y. The cycle count may detect how many cycles have been transferred and allow the debug data, which is of a lower priority, access to the shared bus 105. The randomness of the LFSR may allow the debug data an equal chance at reaching the shared bus 105 for x out of y cycles, and no chance for the remaining cycles.

In some embodiments, debug data 107 may be dropped from the buffer 103. Circumstances which may trigger the dropping of debug data 107 may include, but are not limited to, when the buffer 103 is full, or when a packet of debug data 107 has remained in the buffer 103 for an amount of time exceeding a predefined time threshold. In one embodiment, the functional data 106 is never dropped from the buffer 102.

The arbiter 104 contains logic that may regulate which of the buffers 102 and 103 transmits data over the shared bus 105. For example, when a control signal 109 generated by the arbiter 104 is in a "high voltage" or an "on" state, the functional data 106 may be transmitted from the buffer 102 over the shared bus 105. Alternatively, when the control signal 109 is in a "low voltage" or an "off" state, debug data 107 may be transmitted from the buffer 103 over the shared bus 105. Once transmitted over the shared system bus, the functional data 106 and debug data 107 may be received by another buffer (not shown) which transmits the data to another peripheral device 101B, which may have the same configuration as that depicted in FIG. 1. That is, the peripheral device 101B may also have buffers controlled by an arbiter for establishing the ratio of functional data and debug data transmitted to the peripheral device 101A via the shared bus 105. By adjusting the ratio 108, the arbiter 104 may adjust the amount of debug data 107 that is transmitted over the shared bus 105.

Figure 2:
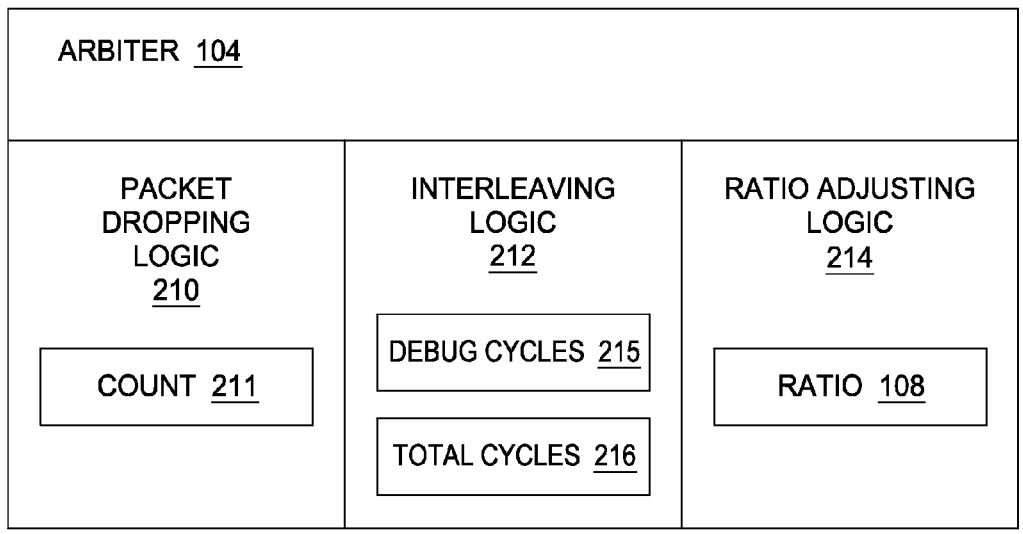
FIG. 2 is a block diagram illustrating a detailed view of the components of an arbiter used for bandwidth limiting PCIe packets generated by a debug source, according to one embodiment disclosed herein.

FIG. 2 is a block diagram 200 illustrating a detailed view of the components of the arbiter 104 used for bandwidth limiting PCIe packets generated by a debug source, according to one embodiment disclosed herein. As shown, the arbiter 104 contains packet dropping logic 210. The packet dropping logic 210 also includes a count 211 which stores the number of times the debug data packets 107 are dropped from the buffer 103. The packet dropping logic 210 may specify when debug data 107 is dropped from the buffer 103. In some embodiments, the packet dropping logic 210 may drop debug data, for example, when the buffer 103 is full, or when a packet of debug data 107 has remained in the buffer 103 for an amount of time exceeding a predefined time threshold.

The arbiter 104 also includes ratio adjusting logic 214. The ratio adjusting logic 214 is configured to adjust the ratio 108 of functional data packets 106 to debug data packets 107 transmitted over the shared bus 105. In some embodiments, the ratio adjusting logic 214 adjusts the ratio 108 to allow for the transmission of more debug data packets 107 based on an increased value stored in the count 211. For example, an increased count 211 may indicate that an anomaly is occurring in the device sending the debug data packets 107. However, many of these packets may not be sent over the shared bus 105 due to insufficient ratio parameters. By identifying a count 211 exceeding a specified threshold, the ratio adjusting logic 214 may adjust the ratio 108 in order to ensure that more of the debug data 107 is transmitted over the system bus 105 such that device anomalies may be identified and repaired. In another embodiment, the ratio adjusting logic may detect a period of decreased transmission of functional data 106 over the shared bus 105, and increase the ratio 108 to allow for more debug data 107 to be transmitted over the shared bus 105.

The ratio adjusting logic 214, in some embodiments, may be configured to transmit the count 211 of dropped debug data 107 to a system administrator by, for example, using the shared bus 105. The system administrator may in turn modify the ratio 108 in response to receiving the count 211. The ratio adjusting logic 214 may be configured to receive an updated ratio from the administrator, and update the ratio 108 accordingly. In some embodiments, the count 211 and the updated ratio may be sent via PCIe or a separate interconnect.

The arbiter 104 also contains interleaving logic 212. The interleaving logic 212 is designed to implement a pattern for interleaving functional data packets and debug data packets. For example, two register settings, shown as debug cycles 215 and total cycles 216, may be set, such that debug data is transferred by the number of debug cycles 215 out of the total cycles 216, where the total cycles 216 is greater than the debug cycles 215. These register settings and a random count, such as the LFSR, provide the bus with enough bandwidth to supply to the functional traffic but also transfer the debug information.

Figure 3:
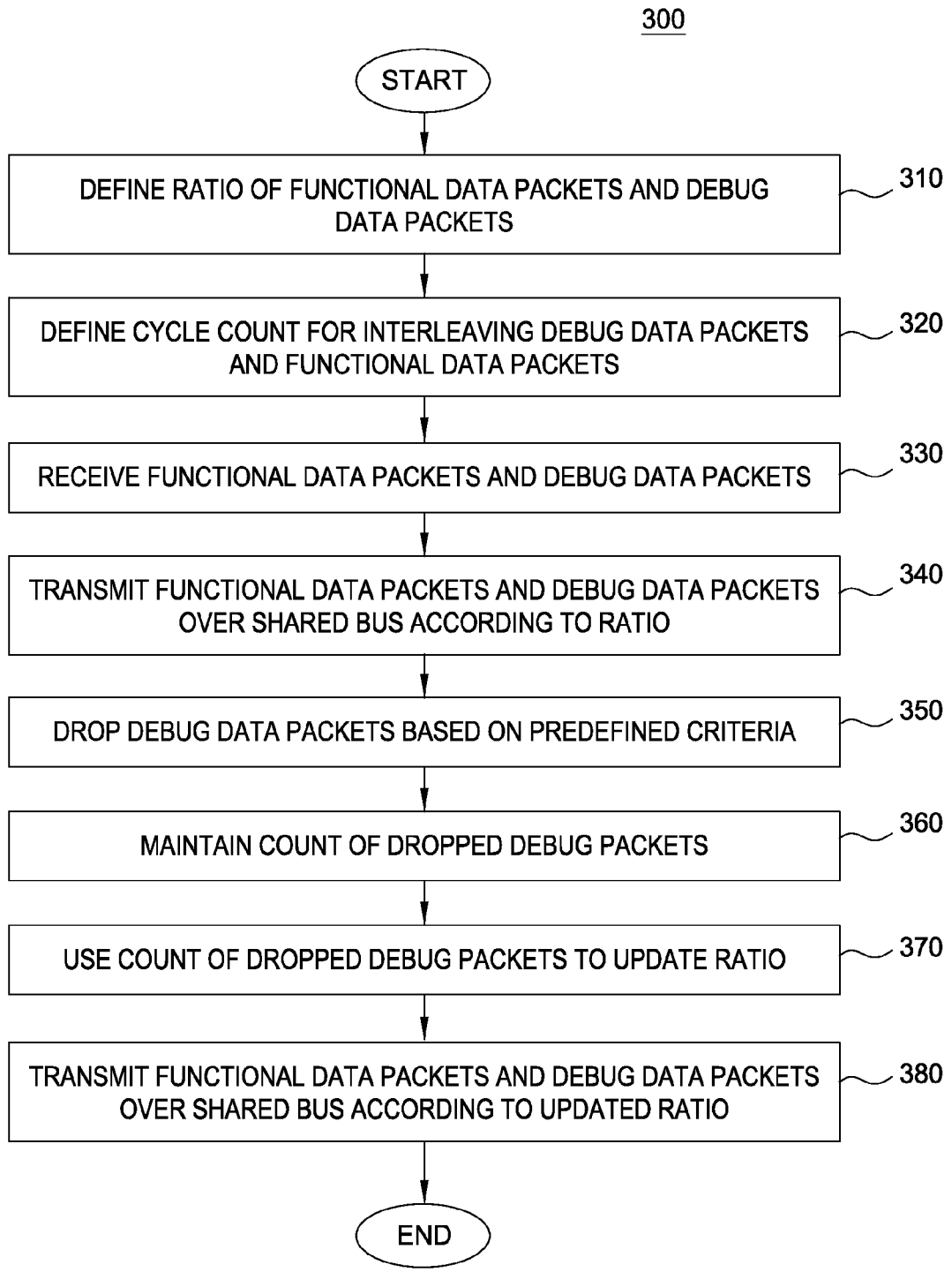
FIG. 3 is a flow chart illustrating a method for bandwidth limiting PCIe packets generated by a debug source, according to one embodiment disclosed herein.

FIG. 3 is a flow chart illustrating a method 300 for bandwidth limiting PCIe packets generated by a debug source, according to one embodiment disclosed herein. Generally, the method 300 may define a ratio of functional data packets and debug data packets to be sent over a shared bus, count a number of dropped debug data packets, and modify the ratio based on the count of dropped debug data packets. At step 310, a ratio of functional data packets to debug data packets which may be transmitted over the shared bus is defined. This ratio may be any ratio sufficient to indicate that x number of functional data packets and y number of debug data packets may be sent per z number of cycles, where x+y=z. The ratio may be defined by any source, including a system administrator, or may be a default ratio. At step 230, a cycle count for interleaving debug data packets and functional data packets may be defined. Interleaving may be necessary to sustain optimal application performance, as solely transmitting debug data for some period of time (even if satisfying the ratio) may leave the applications sitting idle waiting for functional data, or significantly reduce functional data latency performance. Any pattern for interleaving may be implemented. For example, 10 cycles of functional data packets may be sent before 1 cycle of debug data packets may be sent. For example, using a cycle count and a random count (such as a linear feedback shift register (LFSR)), the debug data may be transferred x number of cycles out of y.

At step 330, functional data packets and debug data packets are received in a memory from a device, which in some embodiments, may be a PCIe device. At step 340, the functional data packets and debug data packets are transmitted over the shared bus according to the ratio defined at step 310, and as described in greater detail in reference to FIG. 1. At step 350, debug data packets which have not been sent over the shared bus may be dropped. The debug data packets may be dropped for any reason, for example the memory storing the debug data packets being at or near capacity, or the debug data packets being stale (i.e., having been stored in the memory longer than a predefined amount of time). At step 360, a count of the number of dropped debug data packets may be maintained. At step 370, the count of dropped debug data packets may be used to update the ratio of functional data packets to debug data packets. For example, the count may be compared to a predefined error threshold; if the count exceeds the predefined error threshold, the number of debug data packets transmitted over the shared bus may be increased such that the errors may be identified and corrected. At step 380, functional data packets and debug data packets are transmitted over the shared bus according to the updated ratio.

An Example System

Figure 4:
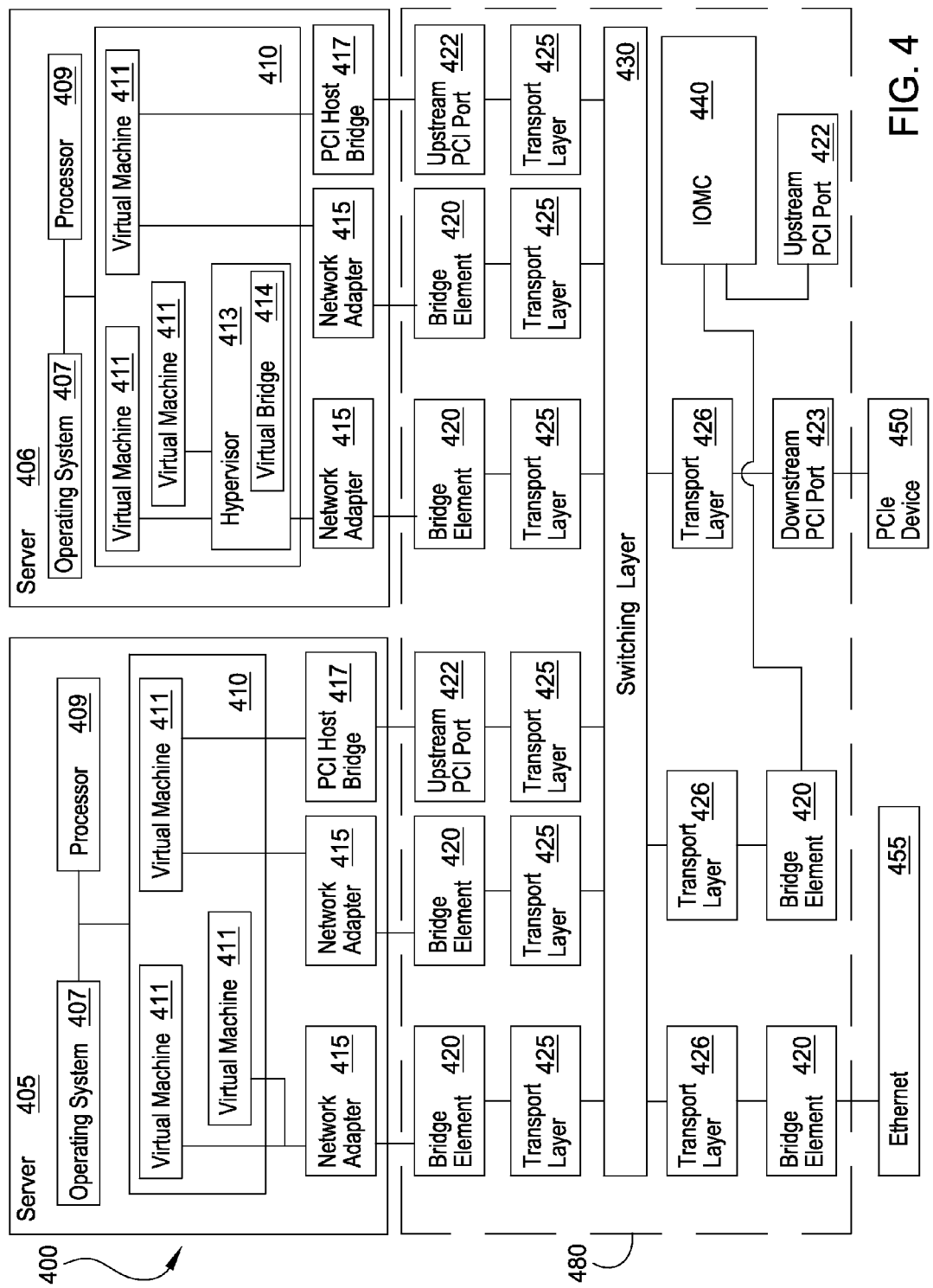
FIG. 4 illustrates a system architecture that includes an arbiter for bandwidth limiting PCIe packets generated by a debug source, according to one embodiment disclosed herein.

FIG. 4 illustrates a system architecture that includes an arbiter for bandwidth limiting PCIe packets generated by a debug source, according to one embodiment described herein. The first server 405 may include at least one processor 409 coupled to a memory 410. The processor 409 may represent one or more processors (e.g., microprocessors) or multi-core processors. The memory 410 may represent random access memory (RAM) devices comprising the main storage of the server 405, as well as supplemental levels of memory, e.g., cache memories, non-volatile or backup memories (e.g., programmable or flash memories), read-only memories, and the like. In addition, the memory 410 may be considered to include memory storage physically located in the server 405 or on another computing device coupled to the server 405.

The server 405 may operate under the control of an operating system 407 and may execute various computer software applications, components, programs, objects, modules, and data structures, such as virtual machines 411.

The server 405 may include network adapters 415 (e.g., converged network adapters). A converged network adapter may include single root I/O virtualization (SR-My) adapters such as a Peripheral Component Interconnect Express (PCIe) adapter that supports Converged Enhanced Ethernet (CEE). Another embodiment of the system 400 may include a multi-root I/O virtualization (MR-IOV) adapter. The network adapters 415 may further be used to implement of Fiber Channel over Ethernet (FCoE) protocol, RDMA over Ethernet, Internet small computer system interface (iSCSI), and the like. In general, a network adapter 415 transfers data using an Ethernet or PCI based communication method and may be coupled to one or more of the virtual machines 411. Additionally, the adapters may facilitate shared access between the virtual machines 411. While the adapters 415 are shown as being included within the server 405, in other embodiments, the adapters may be physically distinct devices that are separate from the server 405.

In one embodiment, each network adapter 415 may include a converged adapter virtual bridge (not shown) that facilitates data transfer between the adapters 415 by coordinating access to the virtual machines 411. Each converged adapter virtual bridge may recognize data flowing within its domain (i.e., addressable space). A recognized domain address may be routed directly without transmitting the data outside of the domain of the particular converged adapter virtual bridge.

Each network adapter 415 may include one or more Ethernet ports that couple to one of the bridge elements 420. Additionally, to facilitate PCIe communication, the server may have a PCI Host Bridge 417. The PCI Host Bridge 417 would then connect to an upstream PCI port 422 on a switch element in the distributed switch 480. The data is then routed via the switching layer 430 to the correct downstream PCI port 423 which may be located on the same or different switch module as the upstream PCI port 422. The data may then be forwarded to the PCI device 450.

The bridge elements 420 may be configured to forward data frames throughout the distributed virtual switch 480. For example, a network adapter 415 and bridge element 420 may be connected using two 40 Gbit Ethernet connections or one 400 Gbit Ethernet connection. The bridge elements 420 forward the data frames received by the network adapter 415 to the switching layer 430. The bridge elements 420 may include a lookup table that stores address data used to forward the received data frames. For example, the bridge elements 420 may compare address data associated with a received data frame to the address data stored within the lookup table. Thus, the network adapters 415 do not need to know the network topology of the distributed switch 480.

The distributed virtual switch 480, in general, includes a plurality of bridge elements 420 that may be located on a plurality of a separate, though interconnected, hardware components. To the perspective of the network adapters 415, the switch 480 acts like one single switch even though the switch 480 may be composed of multiple switches that are physically located on different components. Distributing the switch 480 provides redundancy in case of failure.

Each of the bridge elements 420 may be connected to one or more transport layer modules 425 that translate received data frames to the protocol used by the switching layer 430. For example, the transport layer modules 425 may translate data received using either an Ethernet or PCI communication method to a generic data type (i.e., a cell) that is transmitted via the switching layer 430 (i.e., a cell fabric). Thus, the switch modules comprising the switch 480 are compatible with at least two different communication protocols—e.g., the Ethernet and PCIe communication standards. That is, at least one switch module has the necessary logic to transfer different types of data on the same switching layer 430.

Although not shown in FIG. 4, in one embodiment, the switching layer 430 may comprise a local rack interconnect with dedicated connections which connect bridge elements 420 located within the same chassis and rack, as well as links for connecting to bridge elements 420 in other chassis and racks.

After routing the cells, the switching layer 430 may communicate with transport layer modules 426 that translate the cells back to data frames that correspond to their respective communication protocols. A portion of the bridge elements 420 may facilitate communication with an Ethernet network 455 which provides access to a LAN or WAN (e.g., the Internet). Moreover, PCI data may be routed to a downstream PCI port 423 that connects to a PCIe device 450. The PCIe device 450 may be a passive backplane interconnect, as an expansion card interface for add-in boards, or common storage that can be accessed by any of the servers connected to the switch 480.

Although "upstream" and "downstream" are used to describe the PCI ports, this is only used to illustrate one possible data flow. For example, the downstream PCI port 423 may in one embodiment transmit data from the connected to the PCIe device 450 to the upstream PCI port 422. Thus, the PCI ports 422, 423 may both transmit as well as receive data.

A second server 406 may include a processor 409 connected to an operating system 407 and memory 410 which includes one or more virtual machines 411 similar to those found in the first server 405. The memory 410 of server 406 also includes a hypervisor 413 with a virtual bridge 414. The hypervisor 413 manages data shared between different virtual machines 411. Specifically, the virtual bridge 414 allows direct communication between connected virtual machines 411 rather than requiring the virtual machines 411 to use the bridge elements 420 or switching layer 430 to transmit data to other virtual machines 411 communicatively coupled to the hypervisor 413.

An Input/Output Management Controller (IOMC) 440 (i.e., a special-purpose processor) is coupled to at least one bridge element 420 or upstream PCI port 422 which provides the IOMC 440 with access to the switching layer 430. One function of the IOMC 440 may be to receive commands from an administrator to configure the different hardware elements of the distributed virtual switch 480. In one embodiment, these commands may be received from a separate switching network from the switching layer 430.

Although one IOMC 440 is shown, the system 400 may include a plurality of IOMCs 440. In one embodiment, these IOMCs 440 may be arranged in a hierarchy such that one IOMC 440 is chosen as a master while the others are delegated as members (or slaves).

Figure 5:
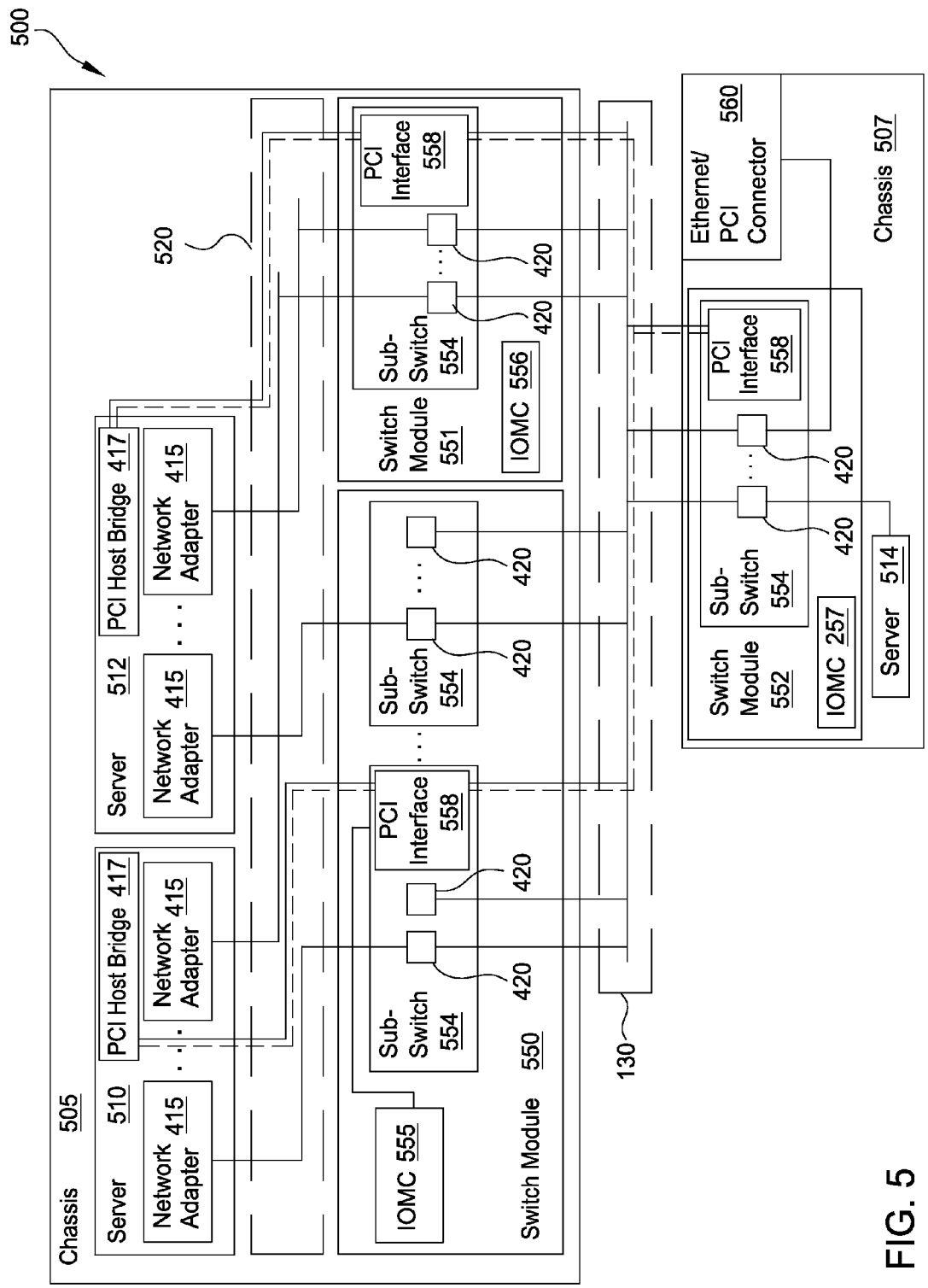
FIG. 5 illustrates the hardware representation of a system that implements an arbiter for bandwidth limiting PCIe packets generated by a debug source, according to one embodiment disclosed herein.

FIG. 5 illustrates the hardware representation of a system that implements an arbiter for bandwidth limiting PCIe packets generated by a debug source, according to one embodiment disclosed herein. Server 510 and 512 may be physically located in the same chassis 505; however, the chassis 505 may include any number of servers. The chassis 505 also includes a plurality of switch modules 550, 551 that include one or more sub-switches 554 (i.e., a microchip). In one embodiment, the switch modules 550, 551, 552 are hardware components (e.g., PCB boards, FPGA boards, etc.) that provide physical support and connectivity between the network adapters 415, PCI Host Bridges 417, PCI interfaces 558, and the bridge elements 420. In general, the switch modules 550, 551, 552 include hardware that connects different chassis 505, 507 and servers 510, 512, 514 in the system 500 and may be a single, replaceable part in the computing system.

The switch modules 550, 551, 552 (e.g., a chassis interconnect element) include one or more sub-switches 554 and an IOMC 555, 556, 557. The sub-switches 554 may include a logical or physical grouping of bridge elements 420—e.g., each sub-switch 554 may have five bridge elements 420. As shown, each sub-switch 554 may also have a PCI interface 558. Each bridge element 420 may be physically connected to the servers 510, 512. For example, a bridge element 420 may route data sent using either Ethernet or PCI communication protocols to other bridge elements 420 attached to the switching layer 430 using the routing layer. However, in one embodiment, the bridge element 420 may not be needed to provide connectivity from the network adapter 415 to the switching layer 430 for PCI or PCIe communications.

Each switch module 550, 551, 552 includes an IOMC 555, 556, 557 for managing and configuring the different hardware resources in the system 500. In one embodiment, the respective IOMC for each switch module 550, 551, 552 may be responsible for configuring the hardware resources on the particular switch module. However, because the switch modules are interconnected using the switching layer 430, an IOMC on one switch module may manage hardware resources on a different switch module. As discussed above, the IOMCs 555, 556, 557 are attached to at least one sub-switch 554 (or bridge element 420) in each switch module 550, 551, 552 which enables each IOMC to route commands on the switching layer 430. For clarity, these connections for IOMCs 556 and 557 have been omitted. Moreover, switch modules 551, 552 may include multiple sub-switches 554.

The dashed line in chassis 505 defines the midplane 520 between the servers 510, 512 and the switch modules 550, 551. That is, the midplane 520 includes the data paths (e.g., conductive wires or traces) that transmit data between the network adapters 415, PCI Host Bridges 417 and the sub-switches 554.

Each bridge element 420 connects to the switching layer 430 via the routing layer. In addition, a bridge element 420 may also connect to a network adapter 415 or an uplink. As used herein, an uplink port of a bridge element 420 provides a service that expands the connectivity or capabilities of the system 500. As shown in chassis 507, one bridge element 420 includes a connection to an Ethernet or PCI connector 560. For Ethernet communication, the connector 560 may provide the system 500 with access to a LAN or WAN (e.g., the Internet). Alternatively, the port connector 560 may connect the system to a PCIe expansion slot—e.g., PCIe device 450. The device 450 may be additional storage or memory which each server 510, 512, 514 may access via the switching layer 430. Advantageously, the system 500 provides access to a switching layer 430 that has network devices that are compatible with at least two different communication methods.

As shown, a server 510, 512, 514 may have a plurality of network adapters 415. This provides redundancy if one of these adapters 415 fails. Additionally, each adapter 415 may be attached via the midplane 520 to a different switch module 550, 551, 552. As illustrated, one adapter of server 510 is communicatively coupled to a bridge element 420 located in switch module 550 while the other adapter is connected to a bridge element 420 in switch module 551. If one of the switch modules 550, 551 fails, the server 510 is still able to access the switching layer 430 via the other switching module.

As shown, a solid line represents the physical layout of the connections between the respective PCI Host Bridges 417 and PCI interfaces 558. The dotted line indicates the flow of data between the PCI Host Bridges 417 and the PCI interfaces 558, via the midplane 520 and the switching layer 430. PCIe data packets may flow from the PCI Host Bridges 417, transmitted to the switch module 550 where it may be received at the PCI interface 558, packaged into cells at a bridge element 420, and transmitted to another switch module or server for further processing. For example, the sub-switch 254 may generate debug data that is transmitted to the server 210 for processing. Accordingly, the PCI Interface 558 includes the buffers and arbiter discussed in FIG. 1 for ensuring the functional data and debug data share the PCI link (i.e., the shared bus) between the PCI interface 558 and the PCI host bridge 417 accordingly to the defined ratio.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A circuit comprising:
   a memory connected to a shared bus, wherein the memory receives debug data packets and functional data packets for transmittal on a shared system bus; and
   an arbiter comprising predefined logic configured to control the transmission, via the shared bus, of the functional data packets and one or more of the debug data packets according to a predefined ratio of debug data packets to functional data packets, wherein one or more of the received debug data packets is dropped from the memory, wherein a count of the one or more dropped debug data packets is maintained, wherein the predefined ratio is updated based on the count, wherein the updated predefined ratio is used to transmit the functional data packets and one or more of the debug data packets.

2. The circuit of claim 1, further comprising:
   upon determining that a number of sequential data packets of a first type transmitted on the shared system bus exceeds a maximum threshold, transmitting at least one data packet of a different, second type, on the shared system bus, wherein the first type and the second type are selected from functional data packets and debug data packets, wherein if the first type is functional data packets, the second type is debug data packets, wherein if the first type is debug data packets, the second type is functional data packets.

3. The circuit of claim 1, wherein each received functional data packet is transmitted via the shared bus.

4. The circuit of claim 1, wherein dropping one or more received debug data packets comprises not transmitting the one or more received debug data packets via the bus.

5. The circuit of claim 1, wherein dropping one or more received debug data packets is based on at least one of: (i) comparing a usage of the memory to a predefined capacity threshold, and (ii) comparing an amount of time the one or more received debug data packets have remained in the memory to a predefined timing threshold.

6. The circuit of claim 1, wherein the updating, based on the count, is performed by a ratio updating logic based on comparing the count to a predefined drop threshold.

7. The circuit of claim 1, wherein the predefined logic is further configured to:
   transmit the count of the dropped debug data packets to a user interface, wherein the count is used to update the predefined ratio; and
   before updating the predefined ratio, receive the updated predefined ratio.

8. A system, comprising:
   a first device configured to send functional data packets and debug data packets via a shared bus to a second device;
   a memory configured to receive the functional data packets and the debug data packets from the first device, wherein the memory is connected to the shared bus; and
   an arbitration circuit configured to:
      transmit, via the shared bus, the functional data packets and one or more of the debug data packets according to a predefined ratio of debug data packets to functional data packets;
      drop one or more of the received debug data packets in the memory;
      maintain a count of the one or more dropped debug data packets;
      update the predefined ratio based on the count; and
      use the updated predefined ratio to transmit the functional data packets and one or more of the debug data packets.

9. The system of claim 8, wherein the arbitration circuit is further configured to:
   upon determining that a number of sequential data packets of a first type transmitted on the shared system bus exceeds a maximum threshold, transmit at least one data packet of a different, second type, on the shared system bus, wherein the first type and the second type are selected from functional data packets and debug data packets, wherein if the first type is functional data packets, the second type is debug data packets, wherein if the first type is debug data packets, the second type is functional data packets.

10. The system of claim 8, wherein each received functional data packet is transmitted via the shared bus.

11. The system of claim 8, wherein dropping one or more received debug data packets comprises not transmitting the one or more received debug data packets via the bus.

12. The system of claim 8, wherein dropping one or more received debug data packets is based on at least one of: (i) comparing a usage of the memory to a predefined capacity threshold, and (ii) comparing an amount of time the one or more received debug data packets have remained in the memory to a predefined timing threshold.

13. The system of claim 8, wherein the updating, based on the count, is performed by a ratio updating logic based on comparing the count to a predefined drop threshold.

14. The system of claim 8, wherein the arbitration circuit is further configured to:
- transmit the count of the dropped debug data packets to a user interface, wherein the count is used to update the predefined ratio; and
- before updating the predefined ratio, receive the updated predefined ratio.

\* \* \* \* \*